United States Patent Office 3,541,031
Patented Nov. 17, 1970

---

3,541,031
SILOXANE-OXYALKYLENE COPOLYMERS
AND USE THEREOF
Robert J. Boudreau, Glens Falls, N.Y., assignor to General Electric Company, a corporation of New York
No Drawing. Application June 7, 1967, Ser. No. 644,047, now Patent No. 3,483,240, dated Dec. 23, 1969, which is a continuation-in-part of application Ser. No. 512,208, Dec. 7, 1965. Divided and this application Oct. 11, 1968, Ser. No. 798,235
Int. Cl. C08g 22/44, 47/04; C08j 1/14
U.S. Cl. 260—2.5                              4 Claims

ABSTRACT OF THE DISCLOSURE

New siloxane-oxyalkylene copolymers contain monoalkyl or monoaryl ethers of polyalkylene glycols attached to silicon-bonded alkylene groups through carbamate linkages. These copolymers are prepared by reacting an alkenyl isocyanate, such as allyl isocyanate, with a polyalkylene glycol monoether to form a urethane and then reacting the urethane with an organopolysiloxane containing silicon-bonded hydrogen groups to produce the siloxane-oxyalkylene copolymer. Copolymers containing up to about 0.5 oxyalkylene groups per silicon atom are useful as urethane foam surfactants and those having more than about 0.5 oxyalkylene groups per silicon atom are useful as sensitizers for heat-sensitive latices.

---

This application is a division of copending application Ser. No. 644,047, filed June 7, 1967 now U.S. Pat. 3,483,240 which in turn is a continuation-in-part of application Ser. No. 512,208, filed Dec. 7, 1965, and now abandoned.

This invention relates to siloxane-oxyalkylene copolymers and to the use of the some of these copolymers as urethane foam surfactants. In particular, this invention is directed to a new class of siloxane-oxyalkylene copolymers having a urethane linkage therein and to the use of certain of these copolymers.

More particularly, this invention relates to siloxane-oxyalkylene copolymers having the formula:

(1)  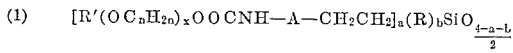

where R is an organic radical attached to silicon through a silicon-carbon linkage, R' is a member selected from the class consisting of lower alkyl radicals, e.g., alkyl radicals containing from 1 to 7 carbon atoms, and aryl radicals having 6 to 10 carbon atoms; A is a divalent hydrocarbon radical containing no more than about seven carbon atoms; $a$ has a value of from 0.05 to 1.00, inclusive; $b$ has a value of from 1.12 to 2.25, inclusive; the sum of $a$ plus $b$ is equal to from 2.02 to 2.40, inclusive; $n$ has a value of from 2 to 4, inclusive; and $x$ has a value of at least 5, e.g., from 5 to 100 or more.

The siloxane-oxyalkylene copolymers of Formula 1 are liquids or soft waxes and are useful as surface active agents because of the different solubility characteristics of the siloxane portion and the oxyalkylene portion of the copolymer. The uses for these surface active copolymers within the scope of Formula 1 include the use of these materials as surfactants in the preparation of emulsions of organopolysiloxanes with various aqueous materials. In addition to this common utility of all of the siloxane-oxyalkylene copolymers within the scope of Formula 1, certain classes of these siloxane-oxyalkylene copolymers are particularly useful for special purposes.

Those siloxane-oxyalkylene copolymers within the scope of Formula 1 which have the formula:

(1a)  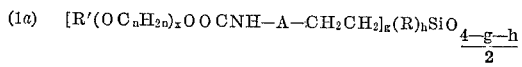

where R, R', A, $n$ and $x$ are as previously defined, $g$ has a value of from 0.05 to 0.5, inclusive, $h$ has a value of from 1.52 to 2.25, inclusive, and the sum of $g$ plus $h$ is equal to from 2.02 to 2.40, inclusive, are useful for the emulsification, nucleation, and stabilization of flexible and rigid polyurethane foams, which foams are prepared by conventional techniques from polyols and various polyisocyanates.

Those siloxane-oxyalkylene copolymers within the scope of Formula 1 which have the formula:

(1b)  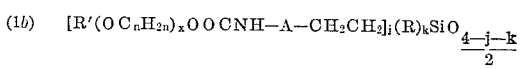

where R, R', A, $n$ and $x$ are as previously defined, $j$ has a value of from 0.50 to 1.00, inclusive, $k$ has a value of from 1.12 to 1.90, inclusive, and the sum of $j$ plus $k$ is equal to from 2.02 to 2.40, inclusive, are particularly useful as sensitizers for heat-sensitive latices as will be described in more detail hereinafter.

The radicals represented by the various letters appearing in structural Formulae 1, 1a, and 1b are well known in the art and are typified by the radicals usually associated with silicon-bonded organic groups in the case of R, the radicals generally associated with monoalkyl ethers of polyalkylene glycols in the case of R' and the usual divalent hydrocarbon radicals in the case of A.

The organic radicals represented by R include radicals having from 1 to 10 carbon atoms selected from the class consisting of monovalent hydrocarbon radicals, halogenated monovalent hydrocarbon radicals, and cyanoalkyl radicals. Illustrative of specific radicals within the scope of these classes can be mentioned, for example, alkyl radicals, e.g., methyl, ethyl, propyl, butyl, octyl, etc. radicals; aryl radicals, e.g., phenyl, tolyl, xylyl, napthyl, etc. radicals; aralkyl radicals, e.g., benzyl, phenylethyl, etc. radicals; olefinically unsaturated monovalent hydrocarbon radicals, e.g., vinyl, allyl, cyclohexenyl, etc. radicals; cycloalkyl radicals, e.g., cyclohexyl, cycloheptyl, etc. radicals; halogenated monovalent hydrocarbon radicals, e.g., chloromethyl, dichloropropyl, 1,1,1-trifluoropropyl, chlorophenyl, dibromophenyl, etc. radicals; cyanoalkyl radicals, e.g., cyanoethyl, cyanopropyl, etc. radicals.

The lower alkyl radicals within the scope of R' include, for example, alkyl radicals containing from 1 to 7 carbon atoms, both straight chain and branched chain. The aryl radicals within the scope of R' include phenyl, tolyl, xylyl, naphthyl, etc. radicals. Illustrative of the divalent hydrocarbon radicals within the scope of A of Formulae 1, 1a, and 1b are divalent aliphatic hydrocarbon radicals, such as methylene and ethylene, as well as divalent aromatic hydrocarbon radicals, such as the various isomeric phenylene radicals and substituted phenylene radicals. In the preferred embodiment of my invention, R is methyl, R' is a lower alkyl radical such as butyl, and A is methylene.

The siloxane-oxyalkylene copolymers within the scope of the present invention, and the scope thereof, can best be understood by the method of preparing these materials. This method of preparation involves the reaction of an unsaturated isocyanate having the formula:

(2)                OCN—A—CH=CH$_2$ with the monoalkyl or monaryl ether of a polyalkylene glycol having the formula:

(3)                R'(OC$_n$H$_{2n}$)$_x$OH to form a urethane having the formula:

(4)     $R'(OC_nH_{2n})_xOOCNH—A—CH=CH_2$

The urethane of Formula 4 is then reacted with an organo hydrogenpolysiloxane having the formula:

(5)     $(H)_a(R)_bSiO_{\frac{4-a-b}{2}}$ to form the copolymer of Formula 1. In the above Formulae 2 through 5, the various letters and subscripts are as previously defined.

The isocyanates within the scope of Formula 2 are well known in the art, with the most common and preferred member of the class being allyl isocyanate, which is within the scope of Formula 2 when A is methylene. Also of interest and use in the practice of the present invention are other isocyanates within the scope of Formula 2, such as p-vinylphenylisocyanate, vinylethylisocyanate, etc.

The polyalkylene glycol monoethers within the scope of Formula 3 are also well known in the art. These materials are formed by reacting a monohydric alcohol of the formula R'OH with an alkylene oxide or mixture of alkylene oxides. By controlling the reaction conditions during the reaction between the aforementioned monohydric alcohol and the polyalkylene oxide, the molecular weight of the polyalkylene glycol monoether can be controlled. While any polyalkylene glycol monoether within the scope of Formula 3 can be employed in the practice of the present invention, it is preferred that the material contain at least 5 oxyalkylene units, i.e., $x$ of Formula 3 is equal to at least 5. In many cases, it is desirable to have $x$ equal to slightly more than 5 as a minimum so as to produce the preferred polyalkylene glycol monoethers employed in the practice of the present invention which are those having a molecular weight of from about 300 to about 5,000. As indicated by Formula 3, the polyalkylene glycol monoethers contain oxyalkylene groups of from 2 to 4 carbon atoms. Included within these oxyalkylene groups are, for example, oxyethylene, oxypropylene-1,2, oxypropylene-1,3, oxybutylene-1,2 etc. The monoether of Formula 3 can contain all similar oxyalkylene groups or a mixture of oxyalkylene groups. In the preferred embodiment of my invention, the oxyalkylene groups are a mixture of oxyethylene groups and oxypropylene-1,2 groups. Where a mixture of ethylene oxide and propylene oxide groups is employed, it is generally preferred to have the oxyethylene groups constitute about 25% to 75% by weight of the total weight of the monoether. Many of the polyalkylene glycol monoethers employed in the practice of the present invention are described in U.S. Pats. 2,425,755 and 2,448,644.

The organohydrogenpolysiloxanes within the scope of Formula 5 are also well known in the art and, as indicated by Formula 5, the organohydrogenpolysiloxane contains an average of from 0.05 to 1.00 silicon-bonded hydrogen atoms per silicon atom. Since there are more than 2.00 total hydrogen atoms and R groups per silicon atom in the organohydrogenpolysiloxane of Formula 5, it is apparent that the polysiloxane is actually a copolymer of two or more different types of siloxane units. Thus, the organohydrogenpolysiloxane of Formula 5 can be described as a copolymer of one or more types of siloxane units having the formula:

(6)     $(H)_c(R)_dSiO_{\frac{4-c-d}{2}}$ where R is as previously defined and $c$ is a whole number equal to from 1 to 2, inclusive, preferably 1, $d$ is a whole number equal to from 0 to 2, inclusive, and the sum of $c$ plus $d$ is equal to 1 to 3, inclusive, together with one or more other types of siloxane units having the formula:

(7)     $(R)_eSiO_{\frac{4-e}{2}}$ where R is as previously defined and $e$ is a whole number equal to from 0 to 3, inclusive. The proportions and types of the siloxane units of Formula 6 and the siloxane units of Formula 7 are selected so as to produce a copolymer containing from 0.05 to 1.00 hydrogen atoms per silicon atom and from 1.12 to 2.25 R groups per silicon atom, with the sum of the number of hydrogen atoms and R groups being equal to from 2.02 to 2.40 per silicon atom. The organopolysiloxanes within the scope of Formula 5 can be prepared by the cohydrolysis of one or more hydrogen-containing chlorosilanes, such as trichlorosilane, dichlorosilane, methylhydrogendichlorosilane, phenylhydrogendichlorosilane, dimethylhydrogenchlorosilane, methylphenylhydrogenchlorosilane, etc., with one or more other organochlorosilanes, such as methyltrichlorosilane, dimethyldichlorosilane, trimethylchlorosilane, methylphenyldichlorosilane, etc., to produce the siloxane within the scope of Formula 5, all of which is well known in the art.

One of the preferred types of organohydrogenpolysiloxanes within the scope of Formula 5 used in preparing the siloxane-oxyalkylene copolymers of the present invention are the triorganosilyl chain-stopped copolymers of diorganosiloxane units and organohydrogensiloxane units having the formula:

(5a)     $(R)_3SiO[(R)_2SiO]_p[(R)(H)SiO]_qSi(R)_3$ where R is as previously defined, $p$ has an average value of from 0 to 45, inclusive, $q$ has a value of from 1 to 48, inclusive, the sum of $p$ plus $q$ is equal to from 3 to 48, and where the sum of the silicon-bonded R groups plus the silicon-bonded hydrogen is equal to from 2.04 to 2.40 per silicon atom. In the preferred embodiment of my invention, all of the R groups are methyl.

The several reactions which are employed to prepare the polysiloxane-oxyalkylene copolymer of Formula 1 are relatively straightforward. The reaction between the isocyanate of Formula 2 and the polyalkylene glycol monoether of Formula 3 is effected by mixing the two ingredients and heating at an elevated temperature until the reaction is complete. It is generally convenient to employ a mutual solvent for the two reactants. Suitable solvents include the aromatic solvents, such as benzene, toluene, and the like. A convenient procedure is to dissolve the polyether in the solvent, making sure that the ingredients are dry, and then add the isocyanate to the resulting mixture. The mixture is then heated to a temperature of from 70° C. to 100° C. and stirred for several hours. The reaction between the isocyanate and the polyalkylene glycol monoether is an equimolar reaction. However, a slight excess of isocyanate is generally used to assure complete reaction of the hydroxyl groups. Generally, the solvent is used in an amount to provide 25 to 50 weight percent solvent. In some cases, it is desirable to employ a catalyst to increase the rate at which the isocyanate and the polyalkylene glycol monoether react. The use of a catalyst is particularly desirable when the terminal hydroxyl group on the polyether is a secondary hydroxyl group, such as in polyethers prepared by reacting a simple alcohol, such as butanol, first with ethylene oxide and then with 1,2-propylene oxide. Where a catalyst is employed, it is found that standard tin salt catalysts, such as the tin salt of 2-ethylhexanoic acid, is satisfactory. The catalyst is generally employed in an amount up to about 0.10% by weight tin octoate, based on the weight of the monoether. After holding the reaction mixture at 80 to 100° C. for one to two hours, the reaction is complete and then, if desired, the solvent can be removed by vacuum distillation.

This reaction results in the formation of a urethane within the scope of Formula 4, which is characterized by a terminal vinyl group. This product may or may not contain solvent, depending upon the particular reaction steps conducted. Regardless of whether solvent is present, the urethane of Formula 4 is reacted with the organohydrogenpolysiloxane of Formula 5 in the presence of a catalyst which promotes the addition of the Si—H group of the organohydrogenpolysiloxane across the double bonds of the vinyl-terminated urethane. The preferred reaction between the urethane and the siloxane involves the reactants in ratios sufficient to provide 5 to 10 percent molar excess of the vinyl-terminated urethane, based on the number of silicon-bonded hydrogen groups in the organohydrogenpolysiloxane. The purpose of the excess of unsaturated groups is to insure that the reaction removes all of the silicon-bonded hydrogen groups so that none is present in the final product.

Suitable catalysts for the addition of the organohydrogenpolysiloxane to the vinyl-terminated urethane are the various platinum and platinum compound catalysts known in the art. These catalysts include elemental platinum in finely divided state, which can be deposited on charcoal or alumina, as well as various platinum compounds, such as chloroplatinic acid, the platinum hydrocarbon complexes of the type shown in Pats. 3,159,601, Ashby and 3,159,662, Ashby, as well as the platinum alcoholate complexes prepared from chloroplatinic acid which are described and claimed in Pat. 3,220,972, Lamoreaux.

Regardless of whether elemental platinum or one of the platinum compound catalysts or platinum complex catalysts is employed, the catalyst is generally used in an amount sufficient to provide about $10^{-4}$ to $10^{-6}$ moles of platinum per mole of the vinyl chain-stopped urethane of Formula 4. The reaction is effected by adding the organohydrogenploysiloxane of Formula 5 to the urethane, either in the presence or absence of the solvent used in the preparation of the urethane, and then the reaction mixture is heated to a temperature of 80 to 150° C. after the platinum compound catalyst is added. After maintaining the reaction mixture at reaction temperature for one to ten hours, the reaction is completed and, where the reaction has taken place in the presence of a solvent, the reaction mixture is heated at a reduced pressure to remove the solvent. This results in the siloxane-oxylalkylene copolymer of Formula 1.

In using the organopolysiloxane-oxyalkylene copolymers of the present invention within the scope of Formula 1a as additives in the preparation of polyurethane foams, the copolymer of Formula 1a is added to the other ingredients of the polyurethane foam reaction mixture in the proportions described below. The polyurethane foam reaction mixtures are conventional mixtures well known in the art and comprise a polyisocyanate and a polyol.

The polyisocyanates which are useful in the practice of the present invention are those well known polyisocyanates which are conventionally used in the manufacture of polyurethane foams. Generally speaking, these polyisocyanates contain at least two isocyanate groups per molecule, with the isocyanate groups being separated from each other by at least three carbon atoms, i.e., the isocyanate groups are not on adjacent carbon atoms in the polyisocyanate. These polyisocyanates can be aromatic or aliphatic, and can be characterized by the formula:

(8) $\qquad Y(N=C=O)_f$ where Y represents a polyvalent organic radical having a valence $f$, where $f$ has a value of at least 2, and preferably from 2 to 3, inclusive. The number of isocyanate groups is, of course, equal to the number of free valences in the radical Y. In general, the radical Y consists preferably of carbon and hydrogen atoms only, but can also include oxygen atoms. Preferably also, the radical Y is a mononuclear aromatic radical. Illustrative of the various polyisocyanates which can be employed in the practice of the present invention can be mentioned, for example, 2,4-toluene diisocyanate; m-phenylene diisocyanate; methylene - bis - (4 - phenylisocyanate); 4-methoxy - m - phenylene diisocyanate; 1,6-hexamethylene diisocyanate; 2,4,6-toluene triisocyanate; 2,4,4'-di-  phenylether triisocyanate; 2,6-toluene diisocyanate; 3,3'-bitolylene - 4,4' - dissocyanate; diphenylmethane - 4,4'-diisocyanate; 3,3' - dimethyldiphenylmethane - 4,4' - diisocyanate; triphenylmethane triisocyanate; dianisidine diisocyanate; etc. In addition to using only a single isocyanate in the production of polyurethane foams, it is also contemplated that mixtures of various isocyanates can be employed.

The polyols employed in the practice of the present invention are those polyols conventionally used in the manufacture of polyurethane foam products. Chemically, these materials fall into one of two general categories. The first is the hydroxyl-containing polyester and the second is the hydroxyl-containing polyether. The polyesters are conventionally formed by the reaction of a polyhydric alcohol with a dibasic acid. The polyhydric alcohol is employed in excess so that the resulting material contains free hydroxyl groups. Illustrative of the types of polyester-polyol materials employed in the production of polyurethane foams are polyesters formed by the reaction between dibasic acids, such as adipic acid, with polyhydric alcohols, such as ethylene glycol, glycerine, pentaerythritol, sorbitol, and the like. In general, these polyester polyols are prepared so as to contain from about 2 to about 8 hydroxyl groups per molecule.

The polyether polyols employed in the practice of the present invention for the manufacture of polyurethane foams can be subdivided into two groups, the first of which is a polyalkylene glycol, such as polyethylene glycol or polypropylene glycol, or mixed polyethylene-polypropylene glycol. The second type is a polyoxyalkylene derivative of a polyhydric alcohol, such as a polyoxyalkylene derivative of glycerine, trimethylol ethane, trimethylol propane, neopentaglycol, sorbitol, sucrose, etc. These materials are well known in the art and are prepared by effecting reaction between an alkylene oxide or a mixture of alkylene oxides and the polyhydric alcohol. One common type of material is prepared by reacting 1,2-propylene oxide with glycerine to form a triol containing three polyoxypropylene segments attached to the glycerine nucleus.

These polyester polyols and polyether polyols are characterized by molecular weights of the order of 350 to 10,000. The type of polyurethane foam desired—flexible, semi-rigid, or rigid—will determine the functionality and molecular weight of the polyol used. In general, either the polyester polyol or the polyether polyol can be used interchangeably in the manufacture of either rigid polyurethane foams, semi-rigid polyurethane foams or flexible polyurethane foams. In general, the polyols used in the formation of rigid foams have molecular weights in the range of from about 350 to 1,000. Generally, these polyols are triols or higher polyols. For the manufacture of semi-rigid foams, the polyol has a molecular weight in the range of about 1,000 to 2,500 and is generally a triol or a mixture of a triol with polyols of higher functionality. For the manufacture of flexible foams, the polyol has a molecular weight of the range of from about 2,500 up to 10,000 and is a triol or a mixture of triol and a diol.

Along with the polyisocyanate and the polyol, a blowing agent is found in the polyurethane foam reaction mixture. The foams are usually blown with carbon dioxide, halocarbon or a mixture of each. Water included in the foam formulation reacts with the isocyanate groups and results in the liberation of carbon dioxide which serves as a blowing agent. However, it is often not desirable to form the low density foams using the carbon dioxide generated in situ as the only blowing agent, since the generation of carbon dioxide also results in cross-linking of the foam through disubstituted urea linkages. A high-level of such linkages results in stiffer foams than would be obtained otherwise.

Accordingly, in those cases where soft foams are desired, the reaction mixture often includes a separate blowing agent, such as a low boiling, inert liquid. The ideal liquid is one which has a boiling point slightly above room temperature, i.e., a temperature of about 20 to 25° C., so that the heat generated by the exothermic reaction between the hydroxyl groups and the isocyanate will warm the reaction mixture to a temperature above the boiling point of the liquid blowing agent and vaporize it. Suitable blowing agents include alkanes having appropriate boiling points, but the most desirable blowing agents have been found to be trichlorofluoromethane or methylene chloride.

In rigid foams intended for thermal insulation, halocarbons are often used exclusively as blowing agents because of the low thermal conductivity of halocarbons as opposed to carbon dioxide or air. Trichlorofluoromethane is the preferred blowing agent for conventional systems, while a mixture of trichlorofluoromethane and dichlorodifluoromethane is used in the well known frothing processes.

Other ingredients often found in the polyurethane foam reaction mixture are various catalysts. For example, it is often desirable to add a catalyst to facilitate the reaction between water present in the reaction mixture and isocyanate groups. A typical type of catalyst for this reaction is a tertiary amine catalyst. These amine catalysts and their use are well known in the art and include materials such as N-methylmorpholine, dimethylethanol amine, triethyl amine, N,N'-diethylcyclohexyl amine, dimethylhexadecyl amine, dimethyloctadecyl amine, dimethylcocoamine, dimethylsilyl amine, N-cocomorpholine, triethylene diamine, etc.

To catalyze the reaction between the hydroxyl groups of the polyol and the polyisocyanate, polyurethane foam reaction mixtures often contain a catalyst comprising a metal salt of an organic carboxylic acid. Most often, this curing agent is a tin salt, such as tin stearate, dibutyl tin dilaurate, tin oleate, tin octoate, etc.

The proportions of the various components of the polyurethane foam reaction mixture may vary within wide limits as is well known in the art. When water is added to the reaction mixture, it is present in an amount sufficient to generate the amount of carbon dioxide desired. Generally, when water is employed, it is present in an amount up to about 5 parts per 100 parts by weight of the polyol. The polyisocyanate is generally present in an excess over the amount theoretically required to react with both the hydroxyl groups of the polyol and any water present in the reaction mixture. Generally, the polyisocyanate is present in an excess equal to about 1 to 15% by weight. When a tertiary amine catalyst is present in the reaction mixture, it is generally employed in an amount equal to from about 0.001 to 3.0 parts per 100 parts by weight of the polyol. When a metal salt curing agent is present, it is generally employed in an amount equal to from about 0.1 to 1.0 part per 100 parts by weight of the polyol. When a separate blowing agent is employed, it is generally employed in an amount equal to from about 1 to 50 parts per 100 parts by weight of the polyol.

When employing the siloxane-oxyalkylene copolymer of Formula 1a as an aid in the formation of polyurethane foams, the copolymer is generally present in an amount equal to from about 0.25 to 4.0 parts by weight per 100 parts by weight of the polyol or mixture of polyols in the reaction mixture. While satisfactory results are obtained using amounts of the copolymer in excess of about 4.0 parts per 100 parts by weight of the polyol, e.g., up to about 7.5 parts, no particular advantage is obtained in employing more than the 4.0 parts by weight.

Polyurethane foams can be prepared by one of two general methods employing the siloxane-oxyalkylene copolymer of Formula 1a. In the first and preferred process, all of the reactants are rapidly mixed together and the reaction mixture is allowed to foam. After foaming has been completed, the resulting foam can be cured if desired by heating at elevated temperatures, e.g., a temperature of from about 75 to 125° C. for several hours. Alternatively, the foam can be stored at room temperature until complete cure has been effected in times of from 24 hours to 48 hours or more.

In the second process, a prepolymer is formed from the polyol and the polyisocyanate to give a prepolymer containing excess polyisocyanate. This prepolymer is then mixed with the other reactants, such as water, tertiary amine catalyst, blowing agent, curing catalyst, and siloxane-oxyalkylene copolymer of Formula 1a and allowed to foam. In a modification of the second process, the polyisocyanate and a portion of the polyol are reacted together to form a base resin. When foaming is desired, the remainder of the polyol, as well as the other ingredients of the reaction mixture, are added to the base resin and the mixture is stirred and allowed to foam. Again, curing can be effected at room temperature or at an elevated temperature.

Regardless of the foaming process in which the polysiloxane-oxyalkylene copolymer of Formula 1 is employed, and regardless of whether the components of the reaction mixture are such as to produce rigid foams, semirigid foams or flexible foams, the use of these copolymers results in foams having small, uniform cells and desirably low densities.

Because of the complexity of the well known technology surrounding the manufacture of polyurethane foam of all types, no attempt will be made here to discuss the many variations in technique and formulations which can be employed. For further details on the technology of polyurethane foams, reference is made to the voluminous patent and technical literature on the subject, especially "Chemistry and Technology," volumes I and II, J. Saunders and K. Frisch, Interscience, New York (1964).

The use of the siloxane-alkylene copolymers of the present invention in heat-sensitive latices is described in detail and claimed in the application of Norman G. Holdstock, Ser. No. 644,055, now U.S. Pat 3,484,394, issued Dec. 16, 1969 filed concurrently herewith and assigned to the same assignee as the present invention. Heat-sensitive latices have the property of coagulating to form a closed film when heated to a certain temperature. These latices, which can be latices of natural rubber or of many types of synthetic rubbers or resins require some type of sensitizing agent. One of the common types of sensitizers has been metal nitrate and, in particular, calcium nitrate. Recently, various types of silicone materials have been used to heat-sensitize latices, but their use has required higher sensitization temperatures or higher concentrations of sensitizer or both. Desirably, this sensitization is effected with a minimum of additive to reduce the cost of sensitization baths.

The siloxane-oxyalkylene copolymers of the present invention are useful in sensitizing natural and synthetic latex formulations employing very small amounts of the copolymer and with relatively low coagulation or sensitization temperatures. These latex baths are generally well known in the art and comprise a major portion of the latex, a minor amount of various curing and vulcanizing agents and vulcanizing accelerators, as well as the sensitizing agent which is the copolymer of Formula 1b after thoroughly mixing the ingredients, a mold heated to a temperature above the sensitization or coagulation temperature is dipped into the sensitized bath and, as soon as the heated mold heats the portion of the bath in contact with the mold to the coagulation temperature, the latex in the bath adjacent the mold surface coagulates to form a uniform film around the mold. The mold is withdrawn from the bath and heated to remove solvent and to cure the formed article. The aforementioned copending Holdstock application is hereby incorporated by reference into the present application for details on the use of the compositions within the scope of Formula 1b in the sensitization of rubber latices.

The following examples are illustrative of the practice of my invention and are not intended for purposes of limitation.

EXAMPLE 1

To a reaction vessel was added a solution of 750 g. of a polyethylene glycol monomethylether containing approximately 16 oxyethylene groups and 300 g. of toluene. This resulting solution was refluxed to insure the removal of water and cooled to room temperature. A 10% molar excess (91 g.) of allylisocyanate was added and the reaction mixture was heated at 100° for 3 hours. Then the toluene and excess allyl isocyanate were removed by distillation at 150° C. and 10 mm. This resulted in a urethane within the scope of Formula 4, where R' is methyl, A is methylene, $n$ is 2, and $x$ is approximately 16. A siloxane-oxyalkylene copolymer within the scope of the present invention was prepared by charging to a reaction vessel 83.3 g. of the urethane prepared above, 26.3 g. of a trimethylsilyl chain-stopped polysiloxane which, on the average, contained 2 trimethylsiloxane chain-stopping units, 6 dimethylsiloxane units and 3 methylhydrogensiloxane units per molecule, 83 g. of toluene and a sufficient amount of the platinum-ethylene complex described in the aforementioned Pat. 3,159,601, Ashby, to provide $10^{-4}$ gram atoms platinum per mole of the urethane. The reaction mixture was heated at reflux for about 10 hours and then the pressure was lowered and the temperature raised sufficiently to strip off the toluene solvent. This resulted in a copolymer which was a soft wax within the scope of Formula 1, where R and R' are methyl, A is methylene, $n$ is 2, $x$ is 16, $a$ is 0.27 and $b$ is 1.91.

EXAMPLE 2

In this example, a siloxane-oxyalkylene copolymer was prepared by mixing 83.3 g. of the urethane prepared in Example 1, 24.4 g. of a trimethylsilyl chain-stopped polysiloxane containing an average of 2 trimethylsiloxane units, 12 dimethylsiloxane units and 6 methylhydrogensiloxane units per molecule, 85 g. of xylene and a sufficient amount of chloroplatinic acid to provide $10^{-5}$ gram atoms of platinum per mole of the urethane. This reaction mixture was refluxed for two hours to produce a siloxane-oxyalkylene copolymer within the scope of Formula 1 in which R and R' are methyl, A is methylene, $n$ is 2, $x$ is 16, where $a$ is 0.30 and $b$ is 1.80. This material was a soft wax at room temperature.

EXAMPLE 3

Following the procedure of Example 1, a urethane within the scope of Formula 4 was prepared from a reaction mixture of 91 g. allylisocyanate, 300 g. toluene and 350 g. of the monomethylether of a polyethylene glycol having an average of 7 oxyethylene groups per molecule. Following the procedure of Example 1, the urethane was added to an organopolysiloxane whose average molecule contained 2 trimethylsiloxane units, 35 dimethylsiloxane units and 17 methylhydrogenpolysiloxane units, employing 190 g. of the urethane, 110 g. of the siloxane, 250 g. of toluene, and sufficient chloroplatinic acid to provide $10^{-6}$ gram atoms of platinum per mole of the urethane. The reaction was effected by refluxing the mixture for 5 hours and then lowering the pressure and increasing the temperature to strip off the toluene solvent. This resulted in a composition within the scope of Formula 1 in which R and R' are methyl, A is methylene, $n$ is 2, $x$ is 7, $a$ is 0.31 and $b$ is 1.75. This material is a clear liquid having a viscosity of 350 centistokes at 25° C.

EXAMPLE 4

Following the procedure of Example 1, a urethane was prepared from 1,000 g. of the monomethylether of a polyethylene glycol containing 21 oxyalkylene groups, 91 g. of allylisocyanate and 500 g. of toluene. The resulting urethane was reacted with a methylhydrogenpolysiloxane in which the average molecule contained 2 trimethylsiloxane units, 6 dimethylsiloxane units, and 1 methylhydrogenpolysiloxane unit. In particular, 120 g. of the urethane, 26 g. of the siloxane, and 100 g. of xylene was reacted in the presence of a sufficient amount of the platinum alcoholate catalyst of Example 1 of Patent 3,220,972, Lamoreaux, to provide $10^{-5}$ gram atoms of platinum per mole of the urethane. After refluxing for 1½ hours, the reaction was completed to produce a siloxane-oxyalkylene copolymer within the scope of Formula 1 in which R and R' are methyl, A is methylene, $n$ is 2, $x$ is 21, $a$ has a value of 0.27, and $b$ has a value of 1.91. This produce was also a wax, but not as soft as the wax of Example 1.

EXAMPLE 5

Following the procedure of Example 1, a urethane was prepared from a reaction mixture comprising 1700 g. of a monobutyl ether of an ethylene glycol-propylene glycol copolymer, 91 g. of allylisocyanate, 500 g. of toluene and 0.85 g. of tin octoate. The monobutyl ether had been prepared by first condensing butanol with a mixture of ethylene oxide and 1,2-propylene oxide to produce a monoether containing an average of 17 ethylene oxide and 13 oxypropylene-1,2 groups per molecule. Then 157 g. of the urethane prepared above were reacted with 40 g. of a methylhydrogenpolysiloxane in the presence of 200 g. toluene and sufficient chloroplatinic acid to provide $10^{-5}$ gram atoms of platinum per mole of the urethane. The polysiloxane was a trimethylsilyl chain-stopped methylhydrogenpolysiloxane containing an average of 2 trimethylsiloxane units, 15 dimethylsiloxane units and 3 methylhydrogensiloxane units per molecule. The reaction mixture was refluxed at a temperature of 115° C. for 3½ hours to produce the product and the pressure was then reduced to 10 mm. and the temperature increased to a pot temperature of about 150° C. to remove the toluene solvent. This product was a liquid having a viscosity of 1650 centistokes at 25° C. The material was a siloxane-oxyalkylene block copolymer within the scope of Formula 1 in which R is methyl, R' is butyl, A is methylene, $n$ has a value of 2.43, $x$ has a value of 30, $a$ has a value of 0.15 and $b$ has a value of 1.95.

EXAMPLE 6

In all of the preceding examples, the urethane employed had been added to an organopolysiloxane in which all of the Si—H groups were present as a portion of a methylhydrogensiloxane unit in the chain. In the present example, the siloxane contains silicon-bonded hydrogen groups both along the chain in methylhydrogensiloxane units and in the two chain ends which are dimethylhydrogensiloxane units. In particular, 157 g. of the urethane prepared in Example 5 was reacted with 40 g. of the siloxane and 200 g. of toluene in the presence of $10^{-5}$ gram atoms of platinum (as chloroplatinic acid) per mole of the urethane. The siloxane contained an average of 2 dimethylhydrogensiloxane units per molecule, 17 dimethylsiloxane units per molecule, and 1 methylhydrogensiloxane unit per molecule. The reaction was effected by heating the mixture at 115° C. for 15 hours at atmospheric pressure and then lowering the pressure to 10 mm. while raising the temperature to 150° C. to remove toluene. This resulted in a clear liquid siloxane-oxyalkylene copolymer having a viscosity of 1950 centistokes at 25° C. This copolymer was within the scope of Formula 1 when R is methyl, R' is butyl, A is methylene, $n$ has an average value of 2.43, $x$ is 30, $a$ is 0.15, and $b$ is 1.95.

EXAMPLE 7

This example illustrates the preparation of a copolymer of the present invention from an organopolysiloxane having the same molecular weight and the same percentage of Si—H groups as in Examples 5 and 6, but in which the siloxane contains a monomethylsiloxane unit and in which all three Si—H groups are present as part of a dimethylhydrogensiloxane unit. The specific reactants were 157 g. of the urethane of Example 5, 40 g. of the siloxane, 200 g. of toluene and an amount of chloroplatinic acid sufficient to form $10^{-5}$ gram atoms platinum per mole of urethane. The siloxane had average molecules with one monomethylsiloxane unit, 16 dimethylsiloxane units, and 3 dimethylhydrogensiloxane units. The mixture was refluxed for 3 hours to produce the copolymer and and heated further at reduced pressure to strip off the toluene solvent. This resulted in a clear fluid having a viscosity of 1600 centistokes at 25° C. and being within the scope of Formula 1 when R is methyl, R' is butyl, A is methylene, $n$ has an average value of 2.43 $x$ is 30, $a$ has a value of 0.15 and $b$ is 1.95.

EXAMPLE 8

In this example, a urethane was prepared by reacting a phenoxy-stopped copolymer of ethylene glycol and propylene glycol with allylisocyanate. The monophenyl ether was prepared by condensing phenol with 1,2-propylene oxide and then with ethylene oxide to produce a monophenyl ether containing 25 oxyethylene groups and 25 oxypropylene-1,2 groups. A urethane was prepared by reacting 2800 parts of this monophenyl ether with 91 parts of allylisocyanate in 1200 parts of toluene. This urethane was within the scope of Formula 4 when A is methylene, R' is phenyl, $n$ has an average value of 2.5, and $x$ has a value of 50. A copolymer was prepared by mixing 138 g. of this urethane with 30 g. of a methylhydrogenpolysiloxane, 168 g. of toluene, and a sufficient amount of the aforementioned platinum alcoholate catalyst to provide $10^{-4}$ gram atoms of platinum per mole of the urethane. The methylhydrogenpolysiloxane contained an average of 1 monomethylsiloxane unit, 20 dimethylsiloxane units, and 3 dimethylhydrogensiloxane units per molecule. This reaction was effected by heating for about 4 hours at a temperature of 110° C. and then reducing the pressure and raising the temperature to remove the toluene solvent. This resulted in a liquid siloxane-oxyalkylene copolymer having a viscosity of 4,500 centistokes at 25° C. and falling within the scope of Formula 1 when R is methyl, R' is phenyl, A is methylene, $n$ has an average value of 2.5, $x$ has a value of 50, $a$ has a value of 0.12 and $b$ has a value of 1.95.

EXAMPLE 9

Following the procedure of earlier examples, 187 g. of the same urethane prepared in Example 5 from allyl isocyanate and the monobutoxy ether of the ethylene glycolpropylene glycol copolymer was added to a mixture of 125 g. of a trimethylsilyl chain-stopped methylhydrogenpolysiloxane containing an average of 3 methylhydrogensiloxane units per molecule and sufficient chloroplatinic acid to provide $10^{-5}$ gram atoms of platinum per mole of the urethane. This reaction mixture was heated at a temperature of about 90° C. for a period of 4 to 5 hours to complete reaction between the silicon-bonded hydrogen atoms and the allyl radicals of the allyl urethane. The resulting product was a liquid having a viscosity of about 1500 centistokes at 25° C. This material was a siloxane-oxyalkylene block copolymer within the scope of Formula 1 in which R is methyl, R' is butyl, A is methylene, $n$ has an average value of 2.43, $x$ has a value of 30, $a$ has a value of 0.6, and $b$ has a value of 1.8.

EXAMPLE 10

A urethane was prepared from allyl isocyanate and a nonylphenol-stopped ethylene oxide-propylene oxide polyether. In particular, the polyether was prepared by condensing nonylphenol with 1,2-propylene oxide and then with ethylene oxide to produce a nonylphenol ether containing an average of 17 ethylene oxide and 13 oxypropylene-1,2 groups per molecule. The urethane was prepared by adding 200 g. toluene to 317 g. of the nonylphenol chain-stopped copolymer of ethylene glycol and propylene glycol and azeotroping off water from the reaction mixture. The reaction mixture was then cooled to 90° C. and 0.15 g. tin octoate was added. The reaction mixture was heated until the coupling reaction had been completed as evidenced by infrared analysis. Then toluene and unreacted allyl isocyanate were stripped from the reaction mixture. To 12.9 g. of the trimethylsilyl chain-stopped methylhydrogenpolysiloxane of Example 9 was added 177 g. of the urethane and sufficient chloroplatinic acid-hexahydrate to provide $10^{-5}$ gram atoms of platinum per mole of the urethane. This reaction mixture was heated at a temperature of 100° C. for 10 hours until all of the silicon-bonded hydrogen atoms had reacted with the allyl radicals of the urethane to produce a clear liquid having a viscosity of 2200 centistokes at 25° C. This material was a siloxaneoxyalkylene block copolymer within the scope of Formula 1 in which R is methyl, R' is nonylphenyl, A is methylene, $n$ has an average value of 2.43, $x$ is 30, $a$ has a value of 0.6, and $b$ has a value of 1.8.

EXAMPLE 11

The procedure of Example 9 was followed in adding 187 g. of the allyl urethane of Example 5 to 8.3 g. of a trimethylsilyl chain-stopped methylhydrogenpolysiloxane containing an average of 7 methylhydrogensiloxane units per molecule in the presence of sufficient chloroplatinic acid to provide $10^{-5}$ gram atoms of platinum per mole of urethane. This product was a clear oil having a viscosity of 1800 centistokes at 25° C. This siloxane-oxyalkylene copolymer was within the scope of Formula 1 when R is methyl, R' is butyl, A is methylene, $n$ has an average value of 2.43, $x$ is 30, $a$ has a value of 0.78, and $b$ has a value of 1.44.

EXAMPLE 12

Following the general procedure of Example 9, 145 g. of the allyl urethane prepared in Example 5 was added to a mixture of 7.6 g. of a trimethylsilyl chain-stopped methyl-hydrogenpolysiloxane having an average of 10 methylhydrogen-siloxane units per molecule in the presence of sufficient chloroplatinic acid hexahydrate to provide $10^{-5}$ gram atoms of platinum per mole of urethane. After heating this reaction mixture for 8 hours at 120° C., the silicon-hydrogen groups of the siloxane had reacted with the allyl radicals to produce a clear siloxane-oxyalkylene copolymer having a viscosity of about 2500 centistokes at 25° C. This copolymer was within the scope of Formula 1 when R is methyl, R' is butyl, A is methylene, $n$ has an average value of 2.43, $x$ is 30, $a$ has a value of 0.83, and $b$ has a value of 1.33.

EXAMPLE 13

Following the general procedure of Example 9, 185 g. of the allyl urethane prepared from allyl isocyanate and the butoxy chain-stopped copolymer of ethylene oxide and propylene oxide of Example 5 was added to 6.0 g. of a trimethylsilyl chain-stopped methylhydrogenpolysiloxane containing an average of about 25 methylhydrogensiloxane groups per molecule. The reaction was effected by heating the reactants in the presence of sufficient chloroplatinic acid hexahydrate to provide $10^{-5}$ gram atoms platinum per mole of the urethane and the reaction mixture was heated at 110° C. for 10 hours. The resulting siloxane-oxyalkylene copolymer had a viscosity of 2500 centistokes at 25° C. and was within the scope of Formula 1 when R is methyl, R' is butyl, A is methylene, $n$ has an average value of 2.43, $x$ is 30, $a$ has a value of 0.93, and $b$ has a value of 1.15.

The foregoing examples have illustrated the preparation of a number of siloxane-oxyalkylene copolymers within the scope of the present invention. The following Examples 14 through 22 illustrate the process of the present invention which involves the use of the siloxane-oxyalkylene copolymers of Formula 1$a$ in the formation of various polyurethane foam formulations.

EXAMPLE 14

A conventional rigid polyurethane foam was prepared by rapidly mixing together 100 g. of crude toluene diisocyanate with a premix consisting of 109 g. of a sucrose-based polyol (hydroxyl No. 490), 40 g. of trichlorofluoromethane, 0.3 g. of triethylene diamine, and allowing the mixture to stand. Immediately upon completion of the mixing, the reaction mixture began to form bubbles and began to rise. However, the bubbles burst almost as fast as they formed and no urethane foam product was obtained. When this same procedure was followed except that the reaction mixtures contained 1.0 g. of any of the siloxane-oxyalkylene block copolymers of Examples 1 through 4, per 100 parts of the polyol, the resulting product foamed to a uniform, fine, closed cell polyurethane having a density of less than 1.7 pounds per cubic foot.

EXAMPLE 15

Five flexible polyurethane foam formulations were prepared, each of which contained 100 g. of a triol, which was the 3,000 molecular weight condensation product of glycerine with propylene oxide, 49 g. of 80/20 toluene diisocyanate, 4.0 g. water, 0.10 g. triethylene diamine, 0.25 g. stannous octoate. The first four mixtures included 1.0 g. of one of the siloxane-oxyalkylene copolymers of Examples 5 through 8, respectively. In each of the four cases, as soon as the reactants were mixed, the composition began to foam until a uniform, open, fine-celled product having a density of less than 1.7 pounds per cubic foot had been formed. In contrast to this, when the siloxane-oxyalkylene block copolymer was omitted from the formulation in the last case, no foam was obtained since the foam collapsed as soon as formed.

EXAMPLE 16

A flexible polyurethane foam was prepared by rapidly mixing 45 g. of the triol of Example 10, 35 g. of a polyol derived from 1,1,1-trimethylolpropane and capped with ethylene oxide, 20 g. of a polypropylene glycol having a molecular weight of about 2,000, 0.3 g. stannous octoate, 42.9 g. 80/20 toluene diisocyanate, 0.1 g. triethylene diamine, 3.4 g. water and 0.25 g. of the siloxane-oxyalkylene block copolymer prepared in Example 5. The trimethylolpropane derivative had a molecular weight of about 4,500 and was prepared by reacting propylene-1,2-oxide with trimethylolpropane. This mixture of ingredients began to foam immediately and produced a polyurethane foam having small, uniform, open cells and with a density of about 1.9 pounds per cubic foot.

EXAMPLE 17

A polyurethane foam was prepared by rapidly mixing 100 g. of the triol of Example 11, 0.2 g. stannous octoate, 47 g. 80/20 toluene diisocyanate, 15 g. trichlorofluoromethane, 0.1 g. triethylene diamine, 3.7 g. water and 4.0 g. of the organosiloxane-oxyalkylene block copolymer of Example 6. This resulted in a foam having uniform, small, open cels with a density of about 1.2 pounds per cubic foot.

EXAMPLE 18

A polyurethane foam was formed by rapidly mixing 100 g. of the triol of Example 10, 0.5 g. stannous octoate, 43 g. toluene dissocyanate, 15 g. trichlorofluoromethane, 0.15 g. triethylene diamine, 3.4 g. water and 2.0 g. of the organopolysiloxane-oxyalkylene block copolymer of Example 8. This material foamed to a flexible foam having small, uniform open cells and a density of about 1.2 pounds per cubic foot.

EXAMPLE 19

A rigid polyurethane foam was prepared by mixing 75.6 g. of a prepolymer prepared by reacting a hexol derived from sorbitol and propylene oxide with toluene diisocyanate in the ratio of 4.5 equivalents of toluene diisocyanate per equivalent of the hexol, 55.6 g. of the aforementioned hexol, 27.8 g. of a mixture of trichlorofluoromethane and triethylene diamine in the ratio of 30 parts of the halogenated methane to 0.8 part of the diamine, and 0.25 g. of the siloxane-oxyalkylene block copolymer of Example 1. The hexol had a molecular weight of about 700 and contained 6 hydroxyl chain-stopped polyoxypropylene groups attached to the sorbitol nucleus. This mixture foamed to a white, rigid polyurethane foam having small, uniform cells and a density of 2.0 pounds per cubic foot.

EXAMPLE 20

A rigid polyurethane foam was prepared by mixing 160 g. of a triol derived from phloroglucinol and propylene oxide, 15 g. of N,N,N',N'-tetra-kis-(2-hydroxypropyl)-ethylene diamine, 1.2 g. of dibutyl tin dilaurate, 137 g. of crude toluene diisocyanate, 57 g. of trichlorofluoromethane, and 3.2 g. of the siloxane-oxyalkylene block copolymer of Example 2. This material foamed to a rigid polyurethane having small, uniform cells and a density of 1.3 pounds per cubic foot.

EXAMPLE 21

A rigid polyurethane foam was prepared by mixing 100 g. of a sorbitol polyol prepared by reacting 1,2-propylene oxide with sorbitol to produce a hexol having a molecular weight of about 700, 96 g. of crude toluene diisocyanate, 0.3 g. triethylene diamine, 35 g. trichlorofluoromethane, and 1.0 g. of the siloxane-oxyalkylene copolymer of Example 2. This resulted in a rigid polyurethane foam having small, closed cells, and a density of 2.0 pounds per cubic foot.

EXAMPLE 22

A rigid polyurethane foam was prepared by mixing 100 g. of a commercial polyether based on methyl glucoside, 110 parts of a polyisocyanate available under the tradename PAPI, 36 g. of trichlorofluoromethane, 0.3 g. triethylene diamine, and 1.0 g. of the siloxane-oxyalkylene copolymer of Example 3. The polyether employed in this example had been prepared by condensing 1,2-oxypropylene with alpha-methylglucoside to produce a material having a molecular weight of 520. The polyisocyanate was a triisocyanate containing 3 phenyl nuclei separated from each other by methylene groups with each phenyl nucleus containing an isocyanate group. Upon mixing this material and allowing it to stand, it formed a rigid, fine, closed cell polyurethane foam having a density of about 1.9 pounds per cubic foot.

The following Examples 23 and 24 illustrate the use of compositions within the scope of Formula 1b as sensitizers for heat-sensitive latices. For many other illustrations of the use of materials within the scope of Formula 1b as sensitizers, reference is again made to the aforementioned copending application of Norman G. Holdstock, filed concurrently herewith, which describes the use of many of such compositions within the scope of Formula 1b in many different latex formulations. Such use is the invention of Norman G. Holdstock and is claimed in the aforementioned copending application. This copending application is incorporated by reference into the present application for further illustrations of the utility of the materials of Formula 1b.

EXAMPLE 23

A series of multi-part compositions were made up. Part A of each composition consisted of 210 parts of an acrylonitrile-methacrylic acid copolymer latex having a solids content of 47 percent by weight. Part B of each composition consisted of 0.5 part of one of the siloxane-oxyalkylene copolymers of Examples 9 through 12, 2.0 parts of a commercial emulsifying agent which was a nonylphenol ether of a polyethylene glycol, and 4.0 parts water. Part C of each composition consisted of 2.5 parts of colloidal sulfur, 2.5 parts finely divided zinc oxide, 0.8 part of zinc diethyl dithiocarbamate, 0.61 part of a condensation product of sodium naphthylene sulfonate with formaldehyde, and 11.4 parts water. For each composition, Part B was added to Part A with good agitation and Part C was then added and the mixture was stirred until well mixed. The coagulation temperature of each of the mixtures was determined by measuring the minimum temperature at which a heated probe would cause coagulation of the mixture to form a rubber layer on the outside of the probe. For the composition using the copolymer of Example 9, the coagulation temperature was 42° C., for the Example 10 material the temperature was 40° C., for the Example 11 and Example 12 material the temperature was 36° C.

EXAMPLE 24

To 200 parts of a 50 percent solids latex of an acrylonitrile-butadiene-methacrylic acid copolymer was added 0.5 part of the copolymer of Example 13. The minimum coagulation temperature for this mixture was 58° C.

While the foregoing examples have illustrated many of the embodiments of my invention, it should be understood that my invention, in its broader aspects, involves the siloxane-oxyalkylene copolymers of Formula 1. Generally, these block copolymers are designed so that the copolymer comprises approximately 3 to 70% by weight organopolysiloxane portion and 30 to 97% by weight of the oxyalkylene portion which includes the urethane linkage. Again, while the oxyethylene group of the oxyalkylene portion of the copolymer can be any single oxyalkylene group within the scope described above, the oxyalkylene portion can also comprise a mixture of two or more different oxyalkylene groups. Various compositions within the scope of the present invention have a special utility for particular uses. Thus, for use as foam cell size control agents in the manufacture of rigid polyurethane foams, it is preferred that the copolymer comprise about 15 to 50% by weight siloxane with the value of subscript $a$ of Formula 1 being from about 0.20 to 0.50 urethane groups per silicon atom. In such case, the polyether can be preferably all ethylene oxide or a mixture of both ethylene oxide and higher oxyalkylene groups. In contrast to this, for the manufacture of flexible polyurethane foams, it is preferred to use copolymers within the scope of Formula 1 in which the composition comprises from about 15 to 30% by weight of silicone and with the value of subscript $a$ in Formula 1 being near the lower portion of the range of values set for $a$, i.e., from about 0.05 to 0.20. Preferably, for copolymers used in the manufacture of flexible urethane foams, the oxyalkylene comprises a mixture of both ethylene oxide and propylene oxide. For other surfactant applications, the value of the various components and radicals and subscripts in Formula 1 can vary within the full range described for these items.

For the manufacture of siloxane-oxyalkylene copolymers of Formula 1 which are to be used as latex coagulants, the block copolymers are designed so that the oxyalkylene portion of the copolymer comprises significantly more than organopolysiloxane portion. For example, the oxyalkylene portion advantageously comprises from 80 to 97 percent by weight of the total copolymer. Also, the oxyalkylene portion is present in a relatively high ratio, i.e., the value of subscript $a$ of Formula 1 is in the range of from 0.5 to 1.00, preferably in the range of from about 0.75 to 1.00.

What I claim as new and desire to secure by Letters Patent of the United States is:

1. The process for forming polyurethane foams which comprises effecting reaction between an organic polyisocyanate and an organic polyol in the presence of a blowing agent and from about 0.25 to 4.0% by weight based on the weight of said polyol of an organosiloxane-oxyalkylene copolymer having the formula:

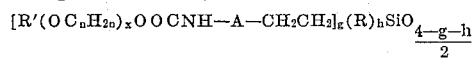

where R is a radical having from 1 to 10 carbon atoms selected from the class consisting of monovalent hydrocarbon radicals, halogenated monovalent hydrocarbon radicals, and cyanoalkyl radicals, R' is a member selected from the class consisting of lower alkyl radicals and aryl radicals having 6 to 10 carbon atoms, A is a divalent hydrocarbon radical containing no more than about seven carbon atoms, $g$ has a value of from 0.05 to 0.50, inclusive, $h$ has a value of from 1.52 to 2.25, inclusive, the sum of $g$ plus $h$ is equal to from 2.02 to 2.40, inclusive, $n$ has a value of from 2 to 4, inclusive, and $x$ has a value of at least 5.

2. The process of claim 1 in which A is methylene.
3. The process of claim 1 in which R is methyl and A is methylene.
4. The process of claim 1 in which R is methyl, A is methylene, and R' is lower alkyl.

References Cited

UNITED STATES PATENTS

| | | | |
|---|---|---|---|
| 3,170,891 | 2/1965 | Speier | 260—37 |
| 3,179,662 | 4/1965 | Haluska | 260—46.5 |
| 3,182,076 | 5/1965 | Holdstock | 260—448.2 |
| 3,404,168 | 10/1968 | Simmler et al. | 260—448.2 |
| 3,420,782 | 1/1969 | Dahm et al. | 252—400 |
| 3,454,504 | 7/1969 | Murai et al. | 260—2.5 |

DONALD E. CZAJA, Primary Examiner

F. E. McKELVEY, Assistant Examiner

U.S. Cl. X.R.

252—312, 357; 260—3, 29.6, 448.2, 482